US011514420B2

(12) United States Patent
Suzuki

(10) Patent No.: US 11,514,420 B2
(45) Date of Patent: Nov. 29, 2022

(54) READER

(71) Applicant: TOSHIBA TEC KABUSHIKI KAISHA, Tokyo (JP)

(72) Inventor: Shigeaki Suzuki, Gotemba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 53 days.

(21) Appl. No.: 17/082,935

(22) Filed: Oct. 28, 2020

(65) Prior Publication Data

US 2021/0233054 A1 Jul. 29, 2021

(30) Foreign Application Priority Data

Jan. 28, 2020 (JP) .............................. JP2020-011568

(51) Int. Cl.
*G06Q 20/20* (2012.01)
*G06K 7/10* (2006.01)
*G06K 7/14* (2006.01)
*G06K 19/06* (2006.01)

(52) U.S. Cl.
CPC ....... *G06Q 20/208* (2013.01); *G06K 7/10861* (2013.01); *G06K 7/1413* (2013.01); *G06K 19/06028* (2013.01); *G06Q 20/203* (2013.01)

(58) Field of Classification Search
CPC ............... G06Q 20/208; G06Q 20/203; G06K 7/10861; G06K 7/1413; G06K 19/06028
USPC ......................................................... 705/22
See application file for complete search history.

(56) References Cited

U.S. PATENT DOCUMENTS

| | | | | |
|---|---|---|---|---|
| 5,767,498 A | * | 6/1998 | Heske, III | ................ G06K 7/14 235/494 |
| 5,939,700 A | * | 8/1999 | Ackley | ............ G06K 19/06028 235/436 |
| 6,179,206 B1 | * | 1/2001 | Matsumori | .......... G06Q 20/343 235/383 |
| 6,540,143 B1 | | 4/2003 | Matsumori | |
| 2003/0158857 A1 | * | 8/2003 | Weng | ..................... G06Q 10/08 |
| 2005/0131763 A1 | | 6/2005 | Junger | |
| 2009/0096588 A1 | | 4/2009 | Mynhardt | |
| 2009/0216652 A1 | * | 8/2009 | Eggert | ..................... G07G 1/14 705/23 |

(Continued)

FOREIGN PATENT DOCUMENTS

| | | |
|---|---|---|
| EP | 3557512 A1 | 10/2019 |
| JP | H11238174 A | 8/1999 |
| JP | 2018160143 A | 10/2018 |

OTHER PUBLICATIONS

Get to Know the Benefits of USB Cables (Year: 2016).*

(Continued)

*Primary Examiner* — Florian M Zeender
*Assistant Examiner* — Nicole Elena Bruner
(74) *Attorney, Agent, or Firm* — Kim & Stewart LLP

(57) ABSTRACT

According to one embodiment, a code reader includes an interface, a scanner, and a processor. The interface transmits and receives data to and from an external device. The scanner reads a code from an item. The processor extracts a portion of code information obtained from the code read by the scanner and transmits the portion of the code information to the external device through the interface.

11 Claims, 3 Drawing Sheets

(56) References Cited

U.S. PATENT DOCUMENTS

| | | | | |
|---|---|---|---|---|
| 2010/0193588 A1* | 8/2010 | Cherry | ............... | G06K 7/10861 235/454 |
| 2010/0223147 A1* | 9/2010 | Oishi | ..................... | G06Q 30/06 235/383 |
| 2011/0108616 A1* | 5/2011 | Wang | .................. | G06K 7/0004 235/375 |
| 2011/0220720 A1* | 9/2011 | Naito | ................... | G06K 7/1456 235/454 |
| 2012/0048927 A1* | 3/2012 | Hasegawa | ............ | G06K 7/1447 235/383 |
| 2012/0054052 A1 | 3/2012 | Wakebe | | |
| 2013/0153655 A1* | 6/2013 | Dawkins | ............... | G07G 1/0045 235/383 |
| 2014/0152507 A1 | 6/2014 | McAllister | | |
| 2016/0110580 A1* | 4/2016 | Shimazawa | .......... | G06K 7/1447 235/462.12 |
| 2017/0053505 A1* | 2/2017 | Lauria | .................. | G06K 7/0008 |
| 2017/0091743 A1* | 3/2017 | Shimazaki | ........... | G06Q 20/208 |
| 2018/0025187 A1* | 1/2018 | Suzuki | ................. | G06Q 20/208 235/437 |
| 2018/0189535 A1* | 7/2018 | Ishida | ...................... | G06K 7/00 |
| 2018/0308110 A1* | 10/2018 | Suzuki | ................. | G06Q 20/208 |
| 2019/0318336 A1 | 10/2019 | Mihara | | |

OTHER PUBLICATIONS

Wayback Machine Proof of Get to Know the Benefits of USB Cables (Year: 2016).*

Extended European Search Report dated Jun. 7, 2021, mailed in counterpart European Application No. 20213320.3, 9 pages.

Chinese Office Action dated Aug. 2, 2022, mailed in counterpart Chinese Application No. 202011205435.1, 14 pages (with translation).

* cited by examiner

READER

CROSS-REFERENCE TO RELATED APPLICATIONS

This application is based upon and claims the benefit of priority from Japanese Patent Application No. 2020-011568, filed on Jan. 28, 2020, the entire contents of which are incorporated herein by reference.

FIELD

Embodiments of the present disclosure relate to a reader.

BACKGROUND

A code to be attached to an article, such as a retail commodity, can be obtained by encoding information obtained by adding a product serial number or the like to an SKU code.

A reader that reads a code from an article transmits code data to an external device, such as a point of sale (POS) terminal. The reader obtains the code data by decoding the code read from the article.

An external device, such as a POS terminal, may not always require a serial number from the article for processing. In such a case, there is a problem that a conventional type reader cannot delete the serial number and then transmit the SKU code to the external device.

DETAILED DESCRIPTION

In general, according to an embodiment, a reader includes an interface, a scanner, and a processor. The interface is configured to transmit and receive data to and from an external device. The scanner is configured to read a code from an item or the like. The processor extracts a portion of code information obtained from the code that has been read by the scanner and then transmits the extracted portion of the code information to the external device through the interface.

Hereinafter, certain example embodiments will be described with reference to the drawings.

A management system according to an embodiment manages articles, items, commodities, products, or the like to which a code has been attached. The management system reads the attached code with a reader, which, in some examples, may also be referred to as a code reader, a code scanner, a barcode reader, a barcode scanner, a product scanner. The management system acquires an SKU (Stock Keeping Unit) code for identifying the article from the code which has been read. The code as read from the article may be referred to as a "read code."

Here, the management system is used, for example, as a settlement system that handles transactions related to a commodity (article) within a store, such as a retail store. The management system acquires a price of the commodity based on the acquired SKU code. The management system then handles settlement (e.g., payment processing, inventory bookkeeping, and the like, associated with customer purchase of the commodity) of the commodity transaction based on the price of the commodity and other information associated with the SKU code.

Figure 1:
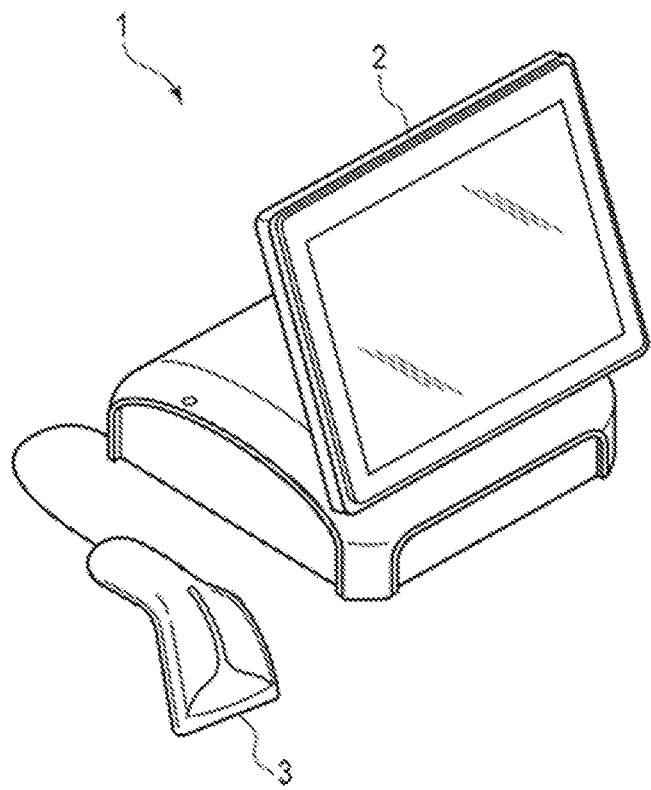
FIG. 1 is a diagram schematically illustrating a configuration example of a management system according to an embodiment.

FIG. 1 illustrates a configuration example of a management system 1 according to an embodiment. As illustrated in FIG. 1, the management system 1 includes a POS terminal 2 and a reader 3. The management system 1 may include additional components and/or aspects associated with settlement processing in addition to the components and/or aspects illustrated in FIG. 1. Likewise, depicted components and/or aspects illustrated in FIG. 1 may be varied, modified, and/or omitted from the management system 1 as discussed further below.

The POS terminal 2 is a device that performs commodity recognition, total amount calculation, and settlement processing. The POS terminal 2 recognizes a commodity based on a SKU code acquired via the reader 3. The POS terminal 2 acquires the amount of money due for purchase of the recognized commodity by referring to a table (e.g., a commodity master list or the like) in which the SKU code and the amount of money due for each commodity or commodity type are associated with each other in advance. The POS terminal 2 calculates the total amount due for the commodities in a sales transaction based on the acquired amounts associated with acquired SKU codes.

The POS terminal 2 can then receive the total amount due from the user (customer). For example, the POS terminal 2 may receive cash payments via a cash drawer device that receives and stores cash. The POS terminal 2 may perform processing associated with credit card payment, electronic money payment, voucher code payment, gift card code payment, or the like.

The reader 3 can be connected to the POS terminal 2 in a wired or wireless manner. The reader 3 reads a code from a commodity while being held by an operator such as a store clerk.

Here, in this context, the code attached to the commodity is either a first code type or a second code type. That is, there are some commodity items to which a first code type is attached and some commodity items to which a second code type is attached.

The first code type is obtained by encoding a SKU code associated with the commodity to which the code is attached. In this example, the first code type is obtained by encoding the SKU code and a check digit of the SKU code. For example, the first code type is a linear, one-dimensional code. For example, the first code type is obtained by encoding data according to CODE 128 high-density linear barcode symbology.

The second code type is obtained by encoding an SKU code associated with the commodity to which the code is attached and a serial number uniquely identifying the commodity to which the code is attached. For example, the second code type is a linear, one-dimensional code. For example, the second code type is obtained by encoding data according to ITF (Interleaved Two of Five) barcode symbology. In other examples, the second code may be a two-dimensional code or the like.

The second code type may be obtained by encoding the SKU code indicating the attached commodity and other information.

For example, the SKU code is a GTIN (Global Trade Item Number) or a JAN (Japanese Article Number) code.

The reader 3 can reads both the first code type and the second code type. The reader 3 either transmits the code of the first code type or the SKU code obtained from the code of the second code type to the POS terminal 2.

Figure 2:
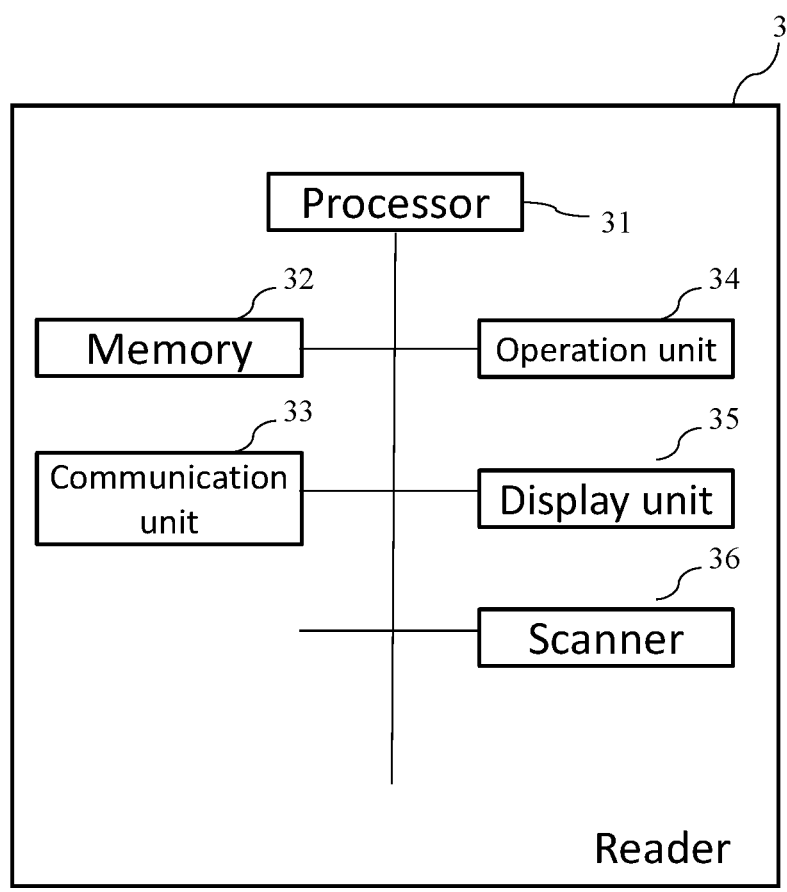
FIG. 2 is a block diagram illustrating a configuration example of a reader according to an embodiment.

FIG. 2 is a block diagram illustrating a configuration example of the reader 3. As illustrated in FIG. 2, the reader 3 includes a processor 31, a memory 32, a communication unit 33, an operation unit 34, a display unit 35, a scanner 36, and the like. The processor 31, the memory 32, the communication unit 33, the operation unit 34, the display unit 35, and the scanner 36 are connected to each other via a data bus or the like.

The reader 3 may include additional components/aspects from those illustrated in FIG. 2 or certain depicted components/aspects depicted in FIG. 2 may be modified, combined, or excluded from the reader 3 in certain examples.

The processor 31 controls the overall operation of the reader 3. For example, the processor 31 causes the scanner 36 to attempt to read a code attached to a commodity. The processor 31 transmits an obtained SKU code to the POS terminal 2 via the communication unit 33.

For example, the processor 31 includes and/or comprises a central processing unit (CPU) or the like. In certain examples, the processor 31 may be or include an ASIC (Application Specific Integrated Circuit) or the like. In other examples, the processor 31 may be or include an FPGA (Field Programmable Gate Array) or the like.

The memory 32 stores various data associated with code reading and the like. For example, the memory 32 functions as a ROM, a RAM, and/or a non-volatile memory (NVM). For example, the memory 32 stores a control program, control parameters, data, and the like. The control program and the control parameters can be incorporated in advance in accordance with the manufacturing and/or user specifications of the reader 3. For example, the control program is a program that supports and/or provides various functions implemented by the reader 3.

The memory 32 temporarily stores data being processed by the processor 31. The memory 32 may store data necessary for executing an application program, a result from execution of the application program, and the like.

The communication unit 33 is an interface for transmitting and receiving data to and from the POS terminal 2. The communication unit 33 can be connected to the POS terminal 2 in a wired or wireless manner. For example, the communication unit 33 is an interface that supports a LAN (Local Area Network) connection, a USB (Universal Serial Bus) connection, or the like.

The operation unit 34 receives inputs from an operator (user) associated with various operations of the reader 3. The operation unit 34 transmits a signal corresponding to the input operation to the processor 31. The operation unit 34 may include buttons, keys, switches, and/or a touch panel.

The display unit 35 displays information under the control of the processor 31. For example, the display unit 35 includes a signal lamp and/or a liquid crystal (LCD) monitor. When the operation unit 34 comprises a touch panel, the display unit 35 can be a liquid crystal monitor integrated with the operation unit 34.

The scanner 36 reads a code of a first code type or a second code type attached to a commodity. For example, the scanner 36 acquires an image of the code by irradiating the code with light and receiving reflected light. The scanner 36 provides the acquired image for the processor 31.

For example, the scanner 36 includes a light for irradiating the code to be read from the commodity with light and an image sensor that reads the code according to the reflected light.

Next, certain functions implemented by the reader 3 will be described. The functions implemented by the reader 3 are, in this instance, implemented by the processor 31 executing a program stored in the memory 32 or the like.

First, the processor 31 has a function of decoding a code that has been read by the scanner 36 to acquire code data.

The processor 31 causes the scanner 36 to acquire a code in accordance with a signal from the operation unit 34 or the POS terminal 2. For example, the processor 31 activates the scanner 36 when a button is pressed by an operator. Here, in this example, it is assumed that the operator holds the scanner 36 over the code that has been attached to the commodity. The scanner 36 acquires an image of the code to provide the image to the processor 31.

The processor 31 acquires an image of the code obtained via the scanner 36. The processor 31 decodes the code included in the image according to a predetermined algorithm. The processor 31 acquires code data by decoding the code in the image.

The processor 31 has a function of determining whether the read code is the second code type based on the acquired code data.

When acquiring the code data, the processor 31 determines whether the code is the second code type based on the code data. That is, the processor 31 determines whether a serial number is included in the code data.

For example, the processor 31 determines whether the read code conforms to CODE 128. When the processor 31 determines that the code conforms to CODE 128, the processor 31 determines that the read code is not the second code type (that is, the read code is of the first code type). When the processor 31 determines that the code does not conform to CODE 128, the processor 31 determines that the read code is the second code type.

When the read code is the second code type, the processor 31 has a function of transmitting the SKU code extracted from the code data to the POS terminal 2 via the communication unit 33.

That is, when it is determined that the read code is the second code type, the processor 31 deletes the serial number from the code data and extracts the SKU code. For example, the processor 31 determines the format of the second code type being used, then extracts the SKU code from the code data based on the determined format.

Upon extracting the SKU code, the processor 31 calculates a check digit from the SKU code according to a predetermined algorithm. After calculating the check digit, the processor 31 transmits the SKU code and the check digit to the POS terminal 2 through the communication unit 33.

When the read code is the first code type, the processor 31 transmits the code data to the POS terminal 2 via the communication unit 33.

The processor 31 in this example has a function permitting a setting of an operation mode. Here, the processor 31 can switch between a normal mode or an extraction mode as the selected operation mode.

The normal mode is an operation mode in which code data is transmitted to the POS terminal 2 regardless of whether the read code is the first code type or the second code type. The extraction mode is an operation mode in which the just SKU code extracted from the code data is transmitted to the POS terminal 2 when the read code is the second code type.

For example, the processor 31 receives a user input for selecting the normal mode or the extraction mode through the operation unit 34. The processor 31 sets the operation mode in accordance with the received user input or the like.

In some examples, the processor 31 may read a code through the scanner 36 for selecting between the normal mode or the extraction mode. In such a case, the processor 31 sets the operation mode according to the read code.

The processor 31 may receive a command for setting the normal mode or the extraction mode from the POS terminal 2 through the communication unit 33. The processor 31 sets the operation mode in accordance with the received command.

In general, the method of setting or selecting the operation mode is not limited to any specific method.

Figure 3:
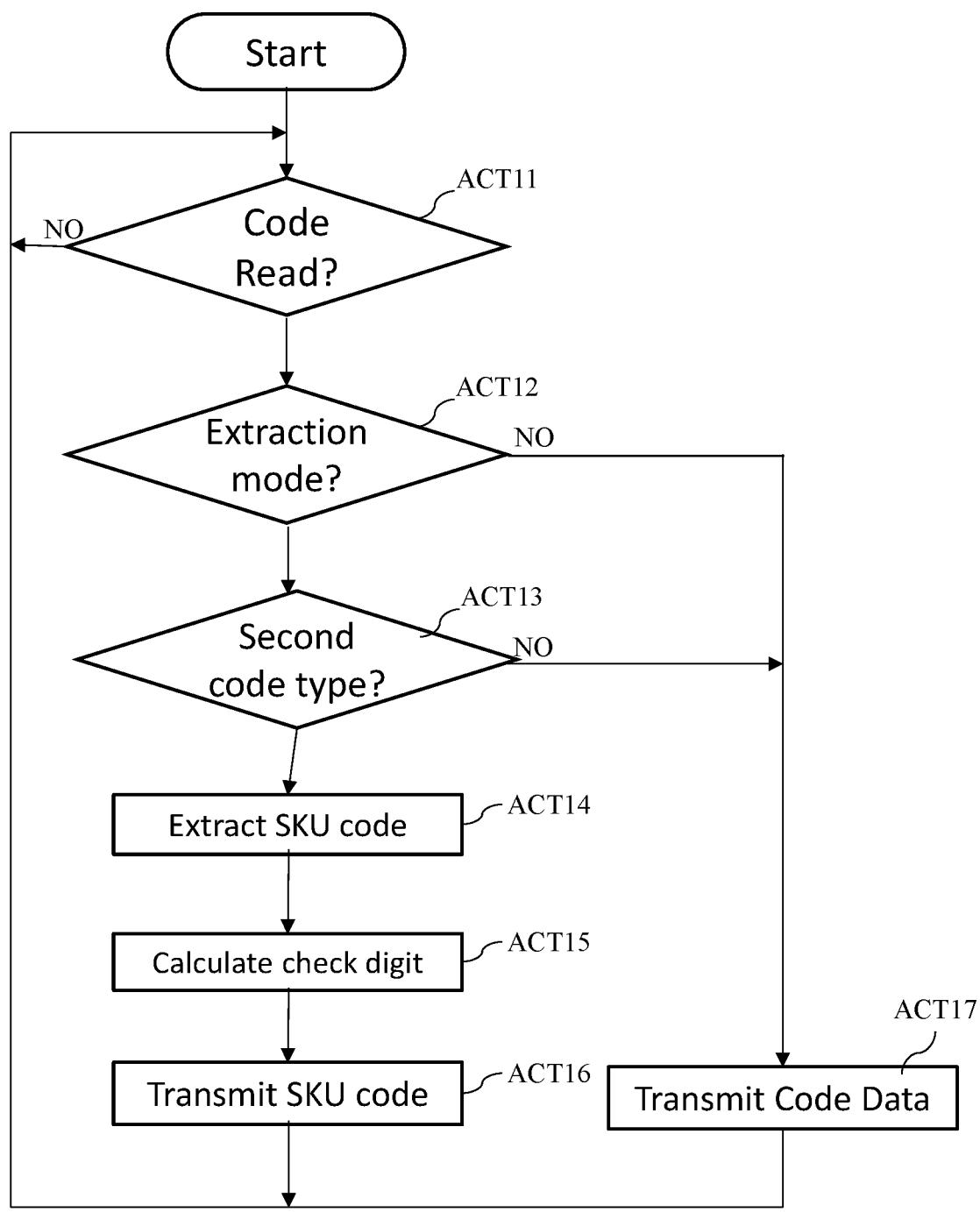
FIG. 3 is a flowchart illustrating an operation example of a reader according to an embodiment.

Next, an operation example of the reader 3 will be described. FIG. 3 depicts a flowchart associated with an operation example of a reader 3.

First, the processor 31 of the reader 3 determines whether the scanner 36 has read a code (ACT11). When it is determined that the scanner 36 has not read the code (ACT11, NO), the processor 31 returns to ACT11.

When it is determined that the scanner 36 has read a code (ACT11, YES), the processor 31 determines whether the extraction mode is set as the operation mode (ACT12). When it is determined that the extraction mode is set as the operation mode (ACT12, YES), the processor 31 determines whether the read code is the second code type (ACT13).

When it is determined that the read code is the second code type (ACT13, YES), the processor 31 extracts the SKU code from the code (ACT14). After extracting the SKU code, the processor 31 calculates a check digit of the SKU code (ACT15).

After the check digit is calculated, the processor 31 transmits the extracted SKU code and the calculated check digit to the POS terminal 2 through the communication unit 33 (ACT16).

When it is determined that the extraction mode is not set as the operation mode (ACT12, NO), or when it is determined that the read code is not the second code (ACT13, NO), the processor 31 transmits the code data obtained by decoding the code to the POS terminal 2 through the communication unit 33 (ACT17).

Once the SKU code and the check digit have been transmitted to the POS terminal 2 (ACT16) or the code data has been transmitted to the POS terminal 2 (ACT17), the processor 31 returns to ACT11.

The processor 31 may display information indicating that the read code is the first code type or the second code type on the display unit 35. For example, when the read code is the first code type, the processor 31 may turn on a signal lamp of the display unit 35. When the read code is the second code type, the processor 31 may turn on another lamp signal lamp of the display unit 35.

In some examples, the reader 3 may be of a stationary type rather than a handheld type. In such a case, the operator holds or passes the commodity to be read over the scanner 36 or the like.

The management system 1 may read a code attached to an article other than a commodity for sale at a retail store or the like. For example, the management system 1 may read a code attached to an article present in a distribution center, a warehouse, a factory, or the like. In general, the content and end use of the article from which the code is read by the management system 1 is not limited.

In some examples, the functions of the reader 3 may be implemented as a driver of a device interface provided in a higher-level device such as a POS terminal. Furthermore, in some examples, the described functions of the reader 3 may be implemented by, or in conjunction with, a server or the like provided between the reader 3 and high-level device executing a program.

A reader 3 configured as described in above example embodiments extracts the SKU code from the code data when the code data obtained by decoding the code includes other information, such as a product serial number, unnecessary for the processes of external device (e.g., POS 2). The reader 3 transmits just the extracted SKU code and check digit to the external device. If the code data does not include any unnecessary information, the reader 3 transmits all of the obtained code data to the external device.

As a result, the reader 3 can properly transmit the SKU code identifying a commodity to the external device regardless of the format of the code being read.

Furthermore, with the reader 3 configured as described above, even when codes of different formats are mixed commodity to commodity, it is not necessary to correct, adjust, or reset the program of the external device that is operating on the assumption that only the first code type will be read.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A reader, comprising:
   an interface configured to transmit data to, and receive data from, an external device;
   a scanner configured to read a code on an item for obtaining code information from the code; and
   a processor having a first operating mode and a second operating mode and configured to:
     determine whether an instruction setting the first or second operating mode has been received via the interface;
     detect whether the code is a first-type code encoding a SKU code for the item or a second type-code encoding both a SKU code and an item serial number for the item;
     when the second operating mode is set and the code is detected as the second type-code, extract a portion of code information obtained from the code read by the scanner and transmit the extracted portion of the code information via the interface to the external device, wherein
       the extracted portion of the code information is the SKU code; and
       the processor is configured to delete the item serial number from the code information obtained from the code read by the scanner before transmitting the remaining code information as the extracted portion of the code information; and
     when the first operating mode is set, transmit the code information via the interface to the external.

2. The reader according to claim 1, wherein the processor is further configured to calculate a check digit of the SKU code.

3. The reader according to claim 1, wherein the scanner is an optical scanner.

4. The reader according to claim 1, wherein the interface comprises a universal serial bus (USB) type connector.

5. The reader according to claim 1, wherein the code is a barcode.

6. An item management system, comprising:
a point-of-sale terminal;
a reader communicatively connected to the point-of-sale terminal via an interface configured to transmit data to, and receive data from, the point-of-sale terminal, the reader including:
   a scanner configured to read a code on an item for obtaining code information from the code; and
   a processor having a first operating mode and a second operating mode and configured to:
      determine whether an instruction setting the first or second operating mode has been received via the interface;
      detect whether the code is a first-type code encoding a SKU code for the item or a second type-code encoding both a SKU code and an item serial number for the item;
      when the second operating mode is set and the code is detected as the second type-code, extract a portion of code information obtained from the code read by the scanner and transmit the extracted portion of the code information via the interface to the point-of-sale terminal, wherein the extracted portion of the code information is the SKU code; and
      the processor is configured to delete the item serial number from the code information obtained from the code read by the scanner before transmitting the remaining code information as the extracted portion of the code information; and
      when the first operating mode is set, transmit the code information via the interface to the external device.

7. The item management system according to claim 6, wherein the processor is further configured to calculate a check digit of the SKU code.

8. A code reader, comprising:
an interface configured to transmit and receive data;
a scanner configured to read coded information on an item, the coded information being of a first code type or a second code type; and
a processor having a first operating mode and a second operating mode and configured to:
   decode the coded information read by the scanner,
   detect whether the code is the first code type encoding a SKU code for the item or the second code type encoding both a SKU code and an item serial number for the item,
   transmit the decoded code information via the interface if the coded information is of the first code type and the first operating mode is set, and
   extract a portion of the decoded coded information and transmit the extracted portion via the interface if the coded information is of the second code type and the second operating mode is set, wherein the extracted portion of the code information is the SKU code; and
   the processor is configured to delete the item serial number from the code information obtained from the code read by the scanner before transmitting the remaining code information as the extracted portion of the code information.

9. The code reader according to claim 8, wherein the scanner is an optical scanner.

10. The code reader according to claim 8, wherein the interface comprises a universal serial bus (USB) type connector.

11. The code reader according to claim 8, wherein the interface is connected to a point-of-sale terminal.

* * * * *